Figure 1:
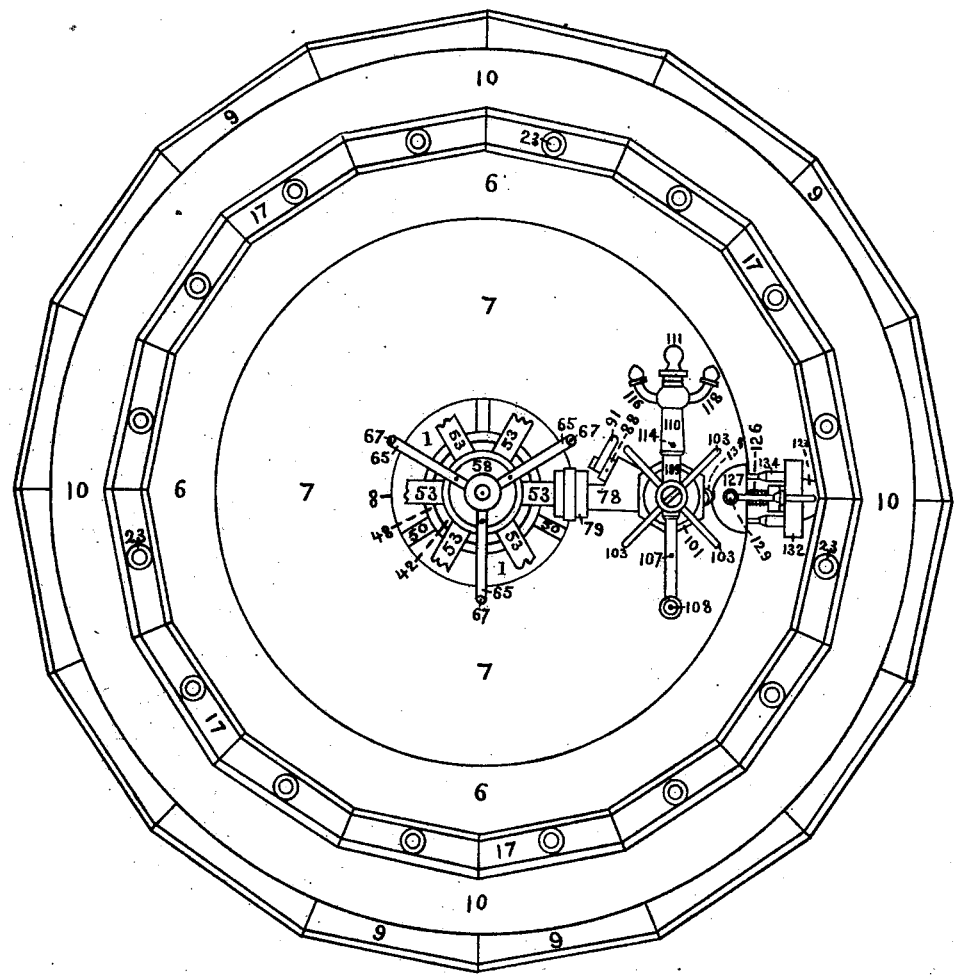

5 Sheets—Sheet 1.

W. P. CLARK.
Tumbler Washer.

No. 242,112.

Patented May 31, 1881.

WITNESSES
John T. Whitman
C. E. L. Breck

INVENTOR,
William P. Clark
By Porter & Hutchinson Attys

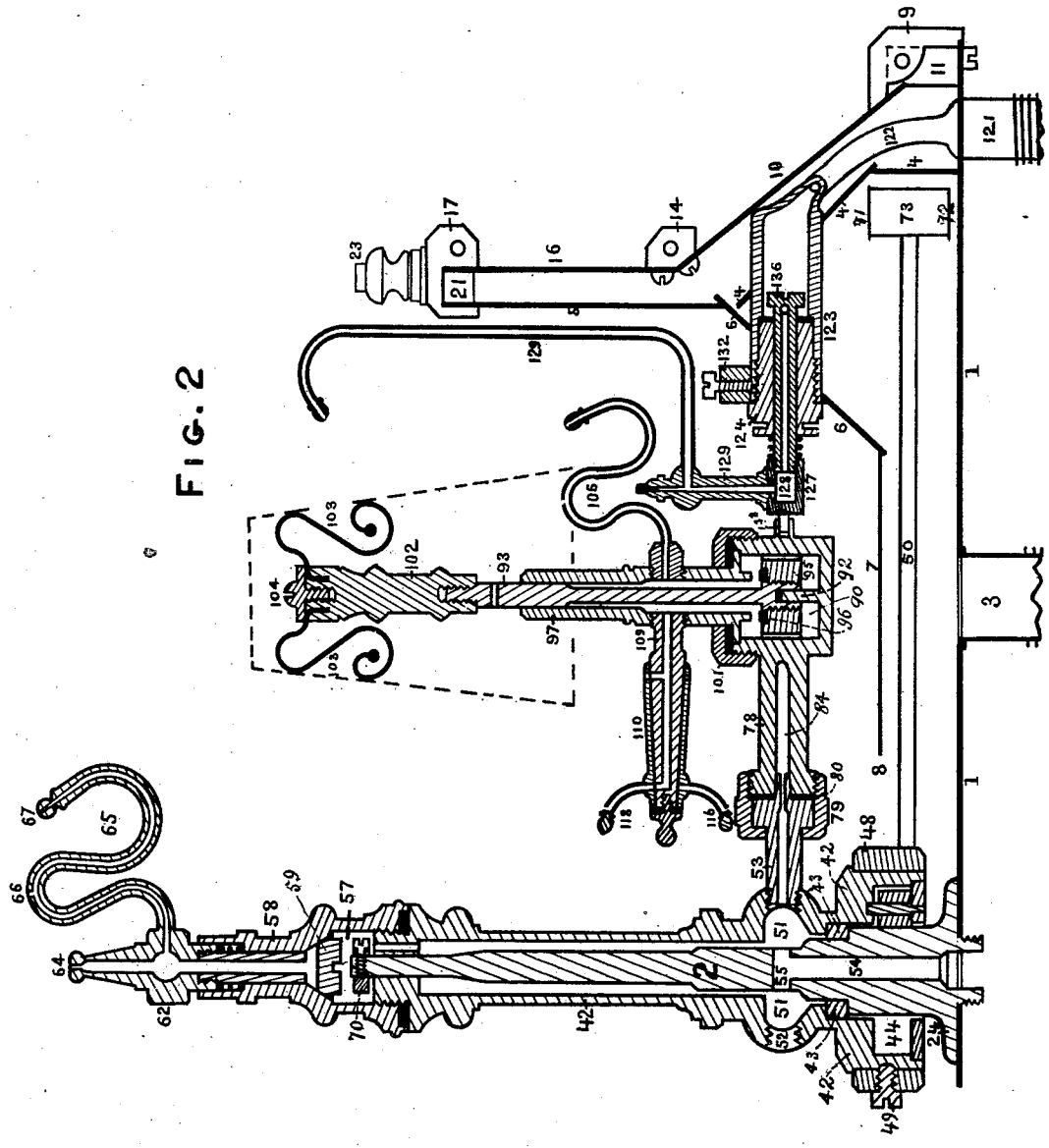

5 Sheets—Sheet 3.
W. P. CLARK.
Tumbler Washer.
No. 242,112. Patented May 31, 1881.
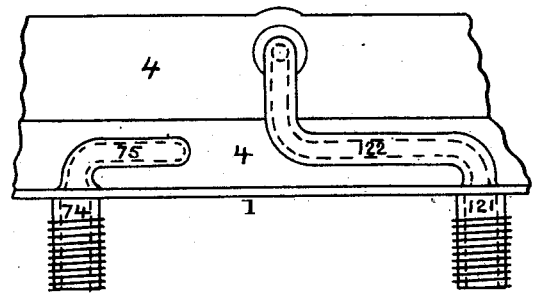
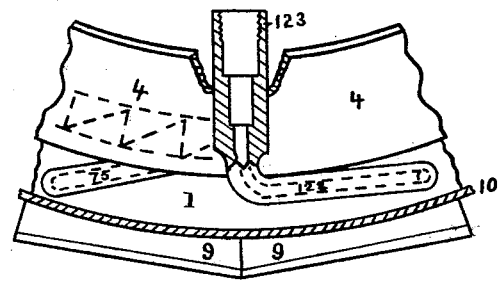
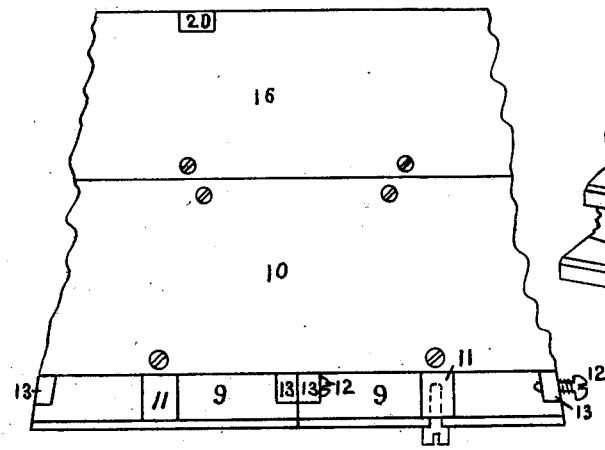
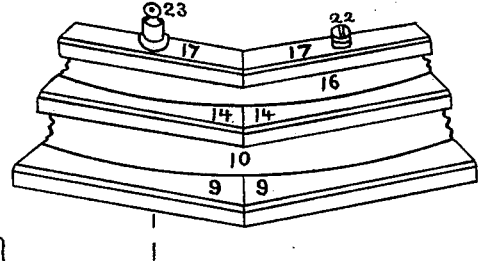
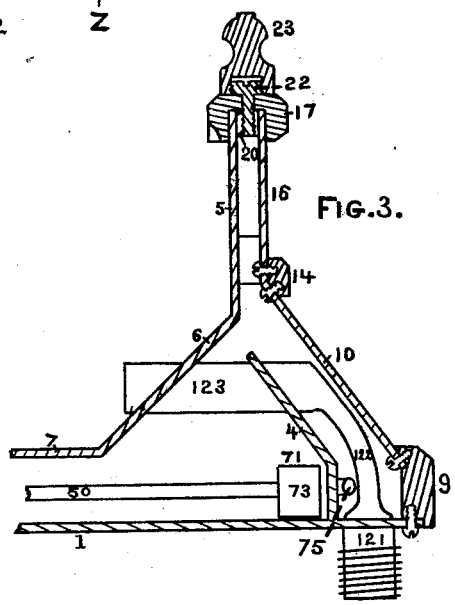
WITNESSES,
John T. Whitman
C. E. C. Breck
INVENTOR,
William P. Clark
By Porter & Hutchinson
Attys 5 Sheets—Sheet 4.
W. P. CLARK.
Tumbler Washer.
No. 242,112. Patented May 31, 1881.
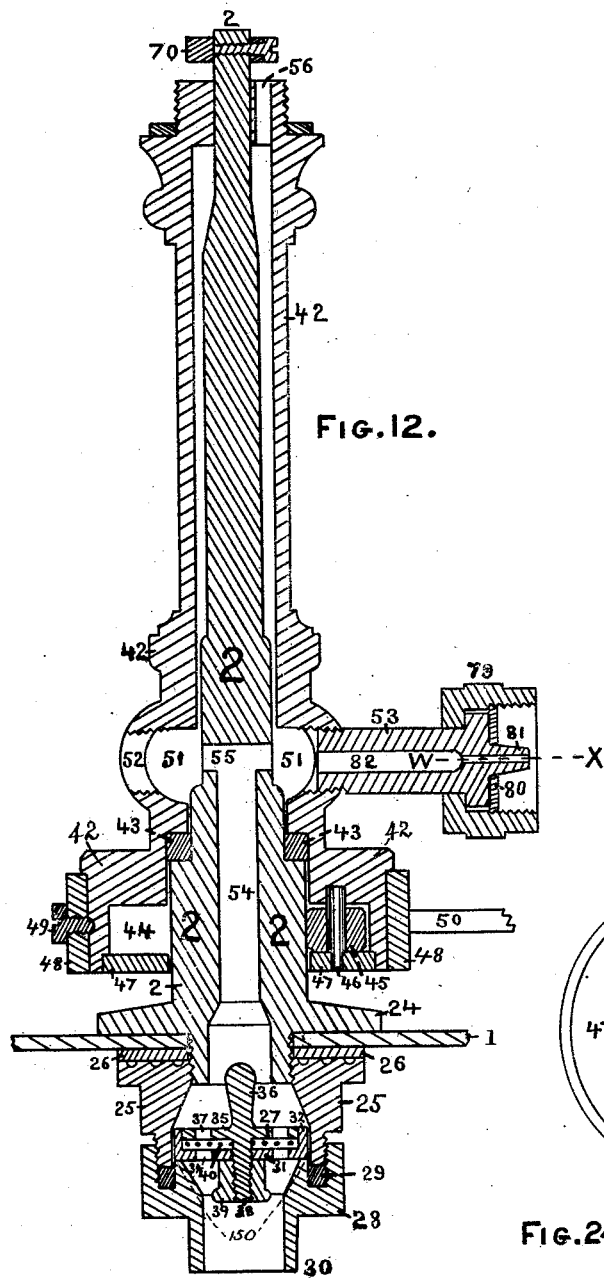
Fig. 12.
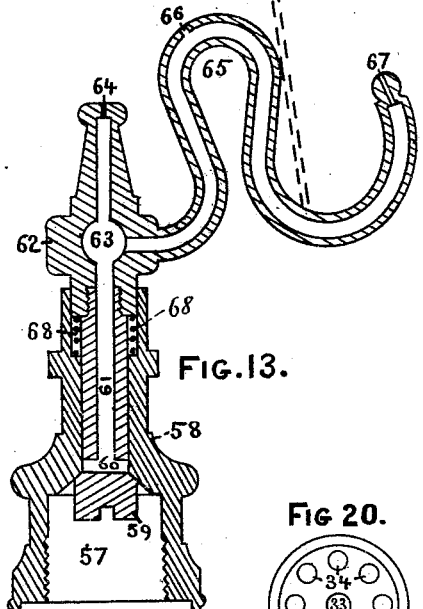
Fig. 13.
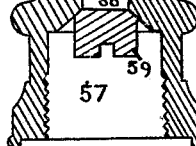
Fig. 25.
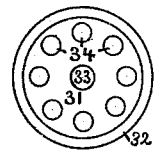
Fig. 20.
Fig. 21.
Fig. 22.
Fig. 23.
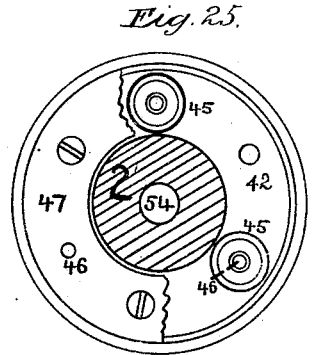
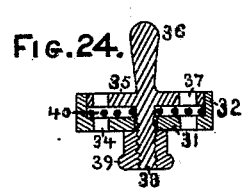
Fig. 24.
WITNESSES,
John T. Whitman
C. E. C. Breck
INVENTOR,
William P. Clark
By Porter & Hutchinson,
Attys.
N. PETERS, Photo-Lithographer, Washington, D. C.

5 Sheets—Sheet 5.
W. P. CLARK.
Tumbler Washer.
No. 242,112. Patented May 31, 1881.
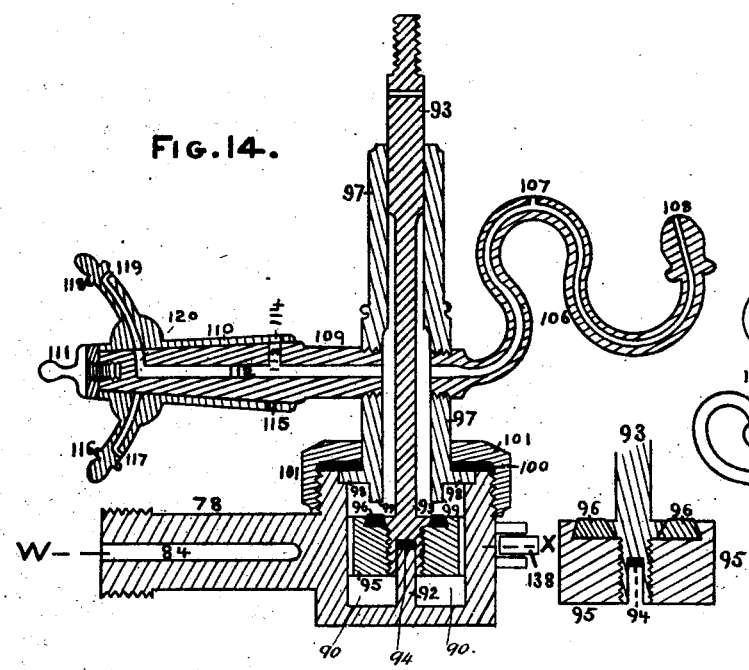
Fig.14.
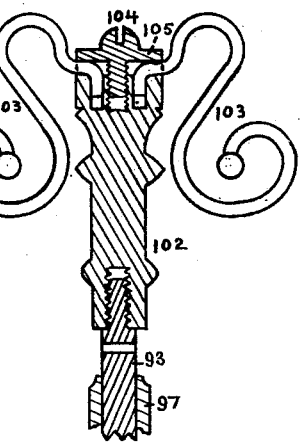
Fig.16.
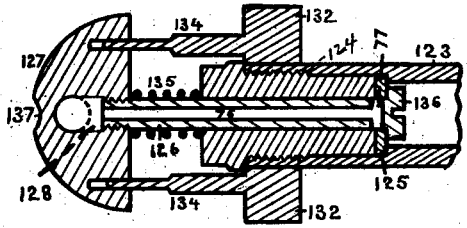
Fig.17.
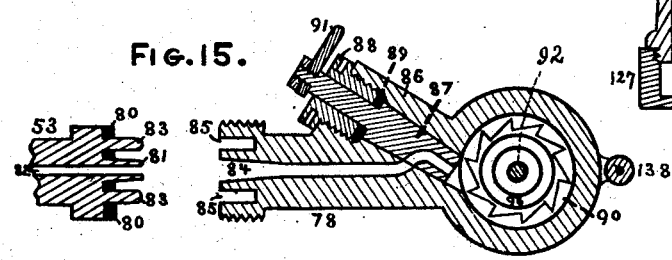
Fig.15.
Fig.18.
WITNESSES.
John T. Whitman
C. E. C. Breck
INVENTOR.
William P. Clark
By Porter & Hutchinson
Attys.

UNITED STATES PATENT OFFICE.

WILLIAM P. CLARK, OF MEDFORD, MASSACHUSETTS.

TUMBLER-WASHER.

SPECIFICATION forming part of Letters Patent No. 242,112, dated May 31, 1881.

Application filed February 27, 1880.

*To all whom it may concern:*

Be it known that I, WILLIAM P. CLARK, of the town of Medford, State of Massachusetts, have invented Improvements in Tumbler-Washers, of which the following is a specification.

The object of my invention is to effect certain improvements in the various details of construction, and in the arrangement and combinations of parts, of tumbler-washers, as will be hereinafter, by the aid of the annexed drawings, fully described and pointed out, and specified in the appended claims.

Figure 1 is a diminished plan view of my improved tumbler-washer, but showing only one of the radial or minor washers. Fig. 2 is a diminished, detached, or semi-diametric vertical section, as taken through the axis of the arm that carries the radial washer shown in Fig. 1, and showing the construction of the basin and the central or major washer. Fig. 3 is a detached vertical section, as taken on line Y Z, Fig. 4, and showing, in elevation, the side washer, induction-pipe and its valve-body, and also showing, in transverse section, the supply-pipe of the large or central motor. Fig. 4 is a detached perspective, showing two connected sections of the segmentary frames of the basin, the outer or ornamental wall thereof, and the connecting screw-cups at the top. Fig. 5 is a detached interior elevation, showing two sections of the lower segmentary frame, the method of uniting the same, the outer or ornamental wall, and the mode of securing the same to the frames. Fig. 6 is a detached elevation, showing the edge of the basin-bottom, the middle wall of the basin, and the induction-conduits which supply the large or central motor, and the side or hand washer. Fig. 7 is a detached top or plan view of the part shown in Fig. 6, but showing the side-washer valve-body in horizontal longitudinal section, its supply-pipe and the supply-pipe of the central motor in plan, the outer wall in horizontal section, and the middle wall as broken away next said valve-body, a section of the rim of the large motor being shown by dotted lines. Fig. 8 is a detached plan view, showing the upper edges of the inner and outer walls of the basin and the manner of attaching thereto the bosses by which the cap-frame is secured in place by screws threaded in said bosses, and by which the inner wall is suspended from the frame. Fig. 9 is an under-side plan view of two sections of the cap-frame, and showing the groove that receives the inner and outer walls. Fig. 10 is a detached plan view, showing the method of securing together the sections of the cap-frame by screw-dowels, the sections being broken away to show the same. Fig. 11 is a view similar to Fig. 10, but representing the middle frame of the basin. Fig. 12 is a vertical longitudinal section of the lower part or section of the central washer, taken in the axial line of the radial arm of the minor washer. Fig. 13 is a detached vertical section of the upper section of the central washer, which was omitted in Fig. 12. Fig. 14 is a detached vertical section, showing the minor washer, its motor-valve, and the extension or joint which connects with the radial arm of the central washer. Fig. 15 is a detached horizontal section, as taken on line W X, Figs. 12 and 14. Fig. 16 is a detached vertical longitudinal section, showing the upper part of the minor washer and the manner of securing the curved tumbler-holding arms in the central stem. Fig. 17 is a detached horizontal longitudinal section of the hand-washer, water-supply valve, and showing the means of opening and closing the same. Fig. 18 is a vertical longitudinal section of the same parts as in Fig. 17, and also showing, in vertical section, the curved delivery-pipe. Fig. 19 is a detached plan view of a part of the circumferential rim of the central motor, a portion of the top casing being broken away to show the water-buckets. Figs. 20 to 23 are plan views of the parts of the central filter, and Fig. 24 is a vertical longitudinal section of the assembled filter. Fig. 25 is a detached inverted or under-side plan view, showing the arrangement of the anti-friction rollers in the base of the rotary sleeve of the central washer, and of the parts to and with which said rollers are connected, all which, in due order, will be hereinafter fully explained.

The construction of the basin or water-receptacle, more specifically shown in the first eleven figures, is as follows:

1 represents the bottom, having an opening for the central standard, 2, to be described, an outlet-passage, 3, Fig. 1, and having such form of outline as will correspond with the inclosing-frame 9. A middle wall, 4, Fig. 3, circular in plan, is soldered or otherwise secured, water-tight, to bottom 1, and it constitutes the inclosing side wall of the water-basin proper.

In Figs. 1, 2, 3 the inner wall of the basin is shown at 5 6 7, the vertical portion being shown at 5, the inclined portion at 6, and the horizontal or bottom portion at 7, these parts being either "cast," "spun," or "struck up" of one entire piece, or else united at their intersecting angles by soldering the edges of the parts together so as to be water-tight.

In Figs. 1, 2 a central opening, 8, is shown in part 7, of sufficient size around the central standard to vent the water which falls therein from the several pipes that deliver it upon the tumblers. This inner wall forms an ornamental interior of the basin, and being water-tight, except at its center and where the side valve is located, it effectually prevents the splashing of water over the low middle wall, 4, which latter prevents the escape of the water, except through aperture 3 in bottom 1.

The numeral 9 represents the sections of the base or lower frame that incloses the basin. They are formed at the upper edge, upon their interior face, with an oblique curved line corresponding with the lower section, 10, of the outer wall, Figs. 1, 2, 3, 7, and with rabbets or seats in straight lines to receive the edge of bottom 1, as shown in Figs. 3 and 5, in which figures is also shown the method of connecting the sections together and of securing bottom 1 thereto, the sections being secured together by screws 12, which engage in the bosses 13, formed at the ends of the sections, as shown in elevation in Fig. 5, and by dotted lines in Fig. 2, the bottom 1 being secured to the sections by screws passing through the former, and threaded in bosses 11, formed upon the interior vertical face of the sections.

The sections of the middle frame or band (numbered 14) are formed upon their inner faces, as arcs of a circle, of such obliquity to each other as to conform to sections 10 and 16 of the outer wall, to which the sections 14 are secured by screws, as shown in Figs. 3 and 5. These sections are secured together at their abutting ends by screw-dowels 15, Fig. 11, which are threaded in the section, as shown.

The sections of the upper or cap frame are shown at 17, and they are united by screw-dowels 18, in the same manner as are the sections 14 of the middle frames, as just described. These cap-sections are formed with a circular groove, 19, Fig. 9, of such width as to receive the inner wall, 5, and outer wall, 16, as shown in Figs. 2, 3.

As shown in Fig. 8, the outer wall, 16, has formed upon or secured to its concave side threaded bosses 20, while inner wall, 5, is upon its convex side provided with like bosses, 21, which hold such inner and outer walls asunder and receive the cap-screws 22, which pass through corresponding holes in the cap-frame and engage in the threads in such bosses, thereby securing the frame to the outer wall and suspending the inner wall by the screws that so engage it.

The ornamental caps 23, Figs. 1, 2, 3, 4, are formed with interior screw-threads, which engage exterior threads formed upon the slotted heads of screws 22, (see Fig. 4,) and are thereby secured to the screws after the latter are in place, and so concealing the head of the screw and constituting an ornamental finish instead of the screw-head disfigured by the slot.

The outline or plan of the outer, inner, and middle walls of the basin is a circle, as shown and described, while the exterior lines of the sections of the upper, middle, and lower frames are represented as straight; but the exterior of these sections may be of any desired configuration, as one important object in thus forming these frames in sections is to facilitate the forming or ornamenting them by electroplating or similar processes, or by the process of casting them with ornamental figures in relief, which could not be done if the frames were not thus formed in sections.

Having thus described the construction of the basin, I will next describe the major or central washer.

The round central standard, 2, is formed with a broad thin base-flange, 24, which rests upon and, preferably, is soldered to bottom 1 of the basin. A threaded concentric extension of the standard passes down through bottom 1, and is engaged by the correspondingly-threaded nut 25, between which and the bottom is interposed the packing-washer 26, which prevents leakage between the standard and bottom. The lower part of nut 25 is concentrically chambered to receive the filter 27, (to be described,) and the coupling-nut 28, whose interior threads engage the exterior threads of nut 25, furnishes a seat for the filter, as shown in Fig. 12, said strainer being seated upon, and vertically supported by, a concentric shoulder formed by the wall of said coupling-nut 28, which wall forms the inner boundary of the groove wherein is seated the packing 29, such strainer being inclosed by the inner periphery of the chambered nut 25, which is threaded to the central standard, 2. The concentric packing 29, seated in a corresponding groove in the coupling-nut, and compressed by the edge of the threaded rim of nut 25, prevents leakage between said nuts.

The central water-induction pipe will be soldered to sleeve 30 of the coupling-nut 28, and supplied with the usual stop-cock, by which to regulate or prevent the flow of water through the filter to the apparatus above.

The referred-to filter, Figs 20 to 24, is described as follows:

31 is the plane of a circular disk, having a concentric rim, 32, a central hole, 33, and a series of holes, 34, arranged near rim 32. A flat disk, 35, is formed with a series of holes, 37, near its outer periphery, and with a hand-knob, 36, on one side, and a threaded stem, 38, on the other, to which latter the threaded nut 39 is fitted.

A finely perforated or meshed strainer, 40, having a central hole, 41, to receive stem 38, is seated within rim 32 of disk 31, and disk 35 being secured in place by nut 39 on stem 38, so that the outer holes in the disks are coincident, as shown in Fig. 24, the water will pass freely through the strainer 40 at such openings in the disks; and as the apertures in such strainer are smaller than are any in the apparatus beyond, it is evident that so long as the filter is in order the apparatus above will not become clogged by impurities in the water; and should the filter become clogged by the arrested impurities it is readily removed and taken apart, and the strainer 40 either cleansed or replaced by a new one at the most trifling cost and in a few moments' time.

42, Figs. 2 and 12, is a sleeve arranged to revolve upon standard 2, and which is vertically sustained by the packing-washer 43, which, as shown, is seated upon a shoulder or enlargement of the standard, while a corresponding inverted shoulder in the sleeve rests upon the packing, and the sleeve therefrom derives its vertical support, as well as that of all its appendages. Thus this packing serves the purpose of an anti-friction washer between the standard and sleeve, and also effectually prevents leakage between the parts. Said packing, being formed of leather or other slightly-yielding anti-friction material, while serving as a packing to render said joint water-tight, also, by separating the respective shoulders of the standard 2 and sleeve 42, obviates the undue friction which would otherwise result from the grinding action which always accompanies the motion of two bodies relatively to and in contact with each other when such bodies are alike in their nature or composition. In the enlarged base of the sleeve is an annular recess, 44, wherein are arranged, upon pivots 46, a series of anti-friction rollers, 45, (see Fig. 25, which is a diminished, inverted, subordinate plan,) which, bearing against the standard, largely obviate the friction otherwise resulting from lateral pressure when the sleeve and its irregularly-distributed load is rotated. Such rollers are vertically sustained by disk 47, secured in such recess, and which furnishes a support for the pivotal pins or arbors 46.

In Figs. 1, 2, 12, the collar 48 is shown as secured to the base of sleeve 42 by the set-screw 49. The radial arms 50 of the central motor, at their converging ends, are secured in this collar.

In sleeve 42, above its base, is an annular chamber, 51, communicating with which are a series of threaded holes, 52, for the reception of the short radial arms 53, which, at their converging ends, are threaded to fit water-tight in said holes. The function of these arms will be presently described.

When water is admitted to the standard, and through the filter, it passes up the axial passage 54 to transverse passage 55, and into chamber 51, and thence upward in the space between the standard and interior of the sleeve to the small passage 56. From thence it enters chamber 57 in the base of the upper section, 58, of the standard, Figs. 2, 13. When this central washer is not in use the further flow of water is arrested by plug 59, which is fitted to slide freely in the axial passage in 58, and whose enlarged base or head is shaped and ground to fit the converging upper lines of the chamber. Just above the base of the plug a transverse passage, 60, passes through it and is intersected by the axial passage 61, which is coincident with a similar passage in upper section, 62, with which latter the plug is connected by screw-threads, as shown in Fig. 13.

In section 62 is a small chamber, 63, with which three or more tubular arms, 65, communicate, Figs. 1, 2, 13, such arms being curved to serve as a seat for the inverted tumbler, (shown by dotted lines,) and having a transverse passage, 66, which delivers the water upon the interior wall of the tumbler, while the jet from the axial passage at 67 cleanses the exterior, and that from central passage, 64, comes in contact with the center of the tumbler-bottom.

At the point of intersection of plug 59 with section 62 the latter is so much the larger as to furnish a concentric shoulder, against which the coiled spring 68 acts with sufficient upward force to seat the head of the plug in the top of the chamber, as shown in Fig. 13; but when the tumbler is seated upon the curved arms the added weight thereof will depress the plug—as spring 68 is compressed—thereby allowing the water in chamber 57 to flow through the plug, whence it will be delivered as described; but when the tumbler is removed from the arms the force of the spring will raise the plug and shut off the water, it being thereto aided by the action of the water upon the lower face of the plug. It should, perhaps, be stated that near the head of standard 2 it fits accurately in the axial passage in sleeve 42, which latter is at this point thereby laterally supported, and that the set-collar 70 is secured to the standard by a screw, as shown in Fig. 12, to prevent the raising of the sleeve and its attachments, either by reason of a sudden and violent impact of the upward water-pressure, or when the apparatus is being handled.

I will next describe the few details of the central or large motor, which, as before stated, is secured to sleeve 42 by collar 48, from which latter arms 50 radiate, and these, at their outer extremity, are secured to the rim, which consists of the upper circular plate, 71, a like lower plate, 72, and the water-buckets 73— formed by properly crimping a strip of thin metal—as shown in Figs. 2, 3, 7, 19. The water that actuates this motor, by its impact upon said buckets, is supplied as follows: The threaded tubular shank 74, Fig. 6, is secured in bottom 1, between base-frame 9 and middle wall, 4, and to it will be secured, by a screwcoupling, a service-pipe with stop-cock, by which the required flow of water can be admitted or shut off. A diminished pipe, 75, is secured to this shank and passes obliquely through middle wall, 4, as shown in Figs. 3, 6, 7, so as to deliver the water in a direction oblique to but crossing the peripheral line of the rim of the motor. And by properly regulating the amount of water thus delivered upon the motor the rotative velocity thereof, and of the apparatus to which it is attached, may be adjusted as desired.

I will next describe one of what I term the "radial washers," which are secured to and derive their water-supply through one of the arms 53, radiating from the central sleeve, 42, and which are not only carried around in an orbit on said arms—by the central motor—but are also rotated upon their own axis by the action of a diminutive motor-valve arranged in a chamber at their base.

In Figs. 2, 14, 15, number 78 is an extension or second joint of a radial arm, 53, the two being secured together by the usual coupling-nut, 79, which is placed upon arm 53 before it is secured in sleeve 42, and which engages the enlarged head of the arm, while its interior screw-threads engage the correspondingly-threaded head of extension 78, thereby forcing the opposing faces upon the interposed packing 80.

Centrally upon the face of arm 53 is formed a hollow spur, 81, through which is continued, in diminished size, the axial passage, 82 in said arm, while on either side of said spur a pin, 83, is inserted in the head of arm 53, as shown in Fig. 15, corresponding holes being formed in packing 80 to receive said spur and pins, while in the head of extension 78 are holes 85 to receive pins 83, while the hollow spur enters the central passage, 84, therein, whereby, when the faces of arm 53 and extension 78 are forced against the packing, the water entering arm 53 is delivered into extension 78, without leakage or danger of the diminutive passage in the spur being clogged by displacement of the substance of the packing, and the pins 83 prevent torsional displacement of extension 78 relatively to arm 53.

An enlargement, 86, Fig. 15, formed upon one side of extension 78, is bored out to receive the taper plug 87, which is secured therein by the holding screw-sleeve 88, which engages in an enlarged threaded portion of the passage in enlargement 86, the annular packing 89 at the inner end of the sleeve being seated upon both the shoulder of the plug at the base of its stem and upon the shoulder in body 86, resulting from the enlarged part of the passage therein. The annular face of the sleeve forces this packing against both said shoulders, and thereby secures the joint from leakage.

The passage 84 is bored in such oblique direction to the axis of extension 78 that it will enter plug 87 at the side and intersect the short axial passage therein near the inner end of the plug, as shown in Fig. 15, so that when the plug is in the position there shown the water entering the radial arm would flow directly through the plug into annular chamber 90 at the end of the extenson 78; but when the plug-lever 91 (rigidly secured upon its stem) is turned over against extension 78, thereby reversing or half revolving the plug, its said passage would not be coincident with passage 84, and hence it would serve as a stop-cock to arrest the flow of the water into chamber 90.

In the center of the bottom of chamber 90 is a stud or pivot, 92, Figs. 2 and 14, upon which is seated the valve-stem 93, in the head of the axial bore of which is the packing 94, Fig. 14, which bears upon pivot 92.

In Figs. 2, 14, 15, the motor-valve 95 is shown with a threaded axial passage, in which the similarly-threaded end of stem 93 is secured. Around the outer periphery of this valve a series of ratchet-like teeth are cut, which serve as buckets upon which the jet of water from plug 87 acts as a force to rotate such valve. The upper face of this valve is formed with a shallow concentric recess, whose encircling wall is cut with downward-diverging lines, while a narrow collar on stem 93, which shoulders on the head of the valve, is cut with downward-converging lines, thus forming between the collar and inner face of the rim on the head of the valve a concentric dovetail groove, in which is secured the ring-packing 96, Figs. 2, 14, 15. A thin annular projection, 99, of sleeve 97 extends below flange 98, so that when the valve rises (as will be explained) packing 96 bears against projection 99, and thereby forms a water-tight joint.

In Figs. 2 and 14 is shown a sleeve, 97, having a circular external flange, 98, which is seated directly in an interior annular recess in the face of the valve body or wall that surrounds chamber 90; and 100 is a packing-washer, which rests upon both flange 97 and the upper face of the valve-body, and receives the compressive face of coupling-nut 101, when it is turned down to render the joint water-tight. By thus seating flange 98 directly upon the wall of the valve-chamber and placing packing 100 above the flange, (or between it and nut 101,) instead of seating such packing between the flange and the face of the valve-body, as has been heretofore done, the sleeve 97 cannot be thrown out of line relatively to the other parts by any force that may be exerted upon it by the coupling-nut 101, as would be the case if the flange of the sleeve rested upon a yielding body of varying density. At the head of sleeve 97 the enlarged portion of stem 93 fits accurately therein and prevents the escape of the water from the chamber in the sleeve at that point.

102 is an enlarged upper section secured to stem 93, as shown in Fig. 16. In the upper face of this section three or more equidistant holes are formed, in which are inserted the inner or converging ends of the radial curved elastic arms 103, as shown in Fig. 16. A screw, 104, having a head-flange, 105, is threaded in the axis of section 102, and by the contact of its flange upon said arms, as shown in Fig. 16, secures them all in place, they being secured from relative radial displacement by being seated in shallow grooves in the face of part 102, as shown by dotted lines in Fig. 16. The position of the tumbler upon these arms when it is being washed is shown by dotted lines in Fig. 2. To deliver the water upon the tumbler when so placed a curved tubular arm, 106, is secured in sleeve 97, (see Figs. 2, 14,) and the water which flows from the chamber in sleeve 97 through the axial passage in said arm is delivered upon the interior of the tumbler from the transverse passage 107, and from the axial passage 108, upon the tumbler's exterior.

A horizontal arm, 109, having an axial passage, 112, is secured in sleeve 97, as shown. A sleeve, 110, is fitted closely but revolves on the arm, being secured in place by the packed cap-screw 111. From passage 112 transverse passages 113 and 120 pass through the shell of the arm, and a larger hole, 114, and smaller one 115, one so arranged in sleeve 110 that by rotating the same either of said passages may be brought to coincide with hole 113 in the arm.

Curved tubular arms 116 and 118 are so arranged upon the sleeve that their respective axial passages may be brought to coincide with passage 120 of the arm, the transverse delivery-passage 119 in arm 118 being larger than is passage 117 in arm 116, so that when the sleeve is in the position shown in Fig. 14 both passages 114 and 119 will deliver larger streams of water; but when the sleeve is reversed passages 115 and 117 will deliver smaller streams, the water passing through passage 113 being delivered upon the interior, and that from passage 120 upon the exterior, of the tumbler as it rests upon arms 103. This straight arm is advantageously employed with the curved arm 106, for the reason that when the user is not hurried with business the curved arm will perform the washing with the desired rapidity, and at such times the straight arm is rendered inoperative by the proper rotation or position of sleeve 110; but when its employment becomes necessary it may be arranged to deliver a larger or smaller quantity, as desired, by the means described, thereby preventing waste of water or vexatious delay.

The rotation of the tumbler, when seated upon arms 103, is caused by the impact of the water-jet delivered from plug 87 upon the teeth or buckets of motor-valve 95, which will be thereby rotated with a speed proportioned to the size of such jet, which will be graduated by adjusting the side orifice in plug 87 relatively to the passage 84 in joint 78, the proper rotation of the plug effecting such adjustment, as described. While the tumblers are being thus revolved upon their own axis they will be carried through their orbit by the action of the central motor, as before described. After the water acts upon motor 95 it flows upward in sleeve 97, and thence through the distributing-arms upon the tumblers, as described. When the tumbler rests upon arms 103 the valve-stem 93 rests and revolves with its superincumbent weight upon pin 92; but when the tumbler is removed the valve 95—by reason of the greater area of its lower than upper face—will, by the force of the water pressing upon such faces, be raised, thereby bringing packing 96 against rim 99, thus shutting off the escape of water through the distributing-arms, the weight to be raised by said valve 95 being so proportioned to the force of the water, as exerted thereon, that said valve will be raised by such pressure when the tumbler is not seated upon arms 103, and will be depressed when the tumbler is seated upon said arms, such rising of the valve, when the tumbler is removed, resulting from the well-known fact, in connection with hydraulic or steam pressure upon pistons or valves, that in computing the pressure-area of the upper face of said valve 95 the area of the cross-section of its stem 93 is to be deducted from the total area of the cross-section of the valve, the remainder being the actual area of such upper face, while no reduction should be made by reason of stud 92 from the area of the lower face of the valve, for the reason that the free moving joint between said stud and the valve will allow the same hydraulic pressure, per area, upon the valve at the upper face or area of the seat of said stud in the valve as upon the face of the valve outside said stud, and hence when the tumbler is removed from arms 103 the preponderating pressure upon the greater area of the lower face of said valve will raise the same. The elastic contact of the tumbler with arms 103 will, by the act of raising the tumbler therefrom, tend to facilitate the rising of the valve against rim 99, as before described.

The side or hand washer is described as follows:

The tubular shank 121, Figs. 3 and 6, secured in bottom 1, between outer wall, 10, and middle wall, 4, is threaded, as shown, and to it is to be coupled a water-supply pipe, with a stop-cock to regulate or stop the flow of water, as desired. Above bottom 1 a curved pipe, 122, Figs. 2, 3, 6, 7, is secured to the shank, and leads to and is connected with valve-body 123, which passes through middle wall, 4, to which it is firmly soldered, and loosely through inner wall, 6, Figs. 2, 3, 6, 7, 18, and the water which enters shank 121 from a supply-pipe, as described, will pass through pipe 122 into the valve-body, to be economized in the manner to be described.

124 is a screw-sleeve inserted and threaded in body 123, as shown in Figs. 17 and 18. At the inner end of this sleeve is the packing 125, seated between the inner end or face of the sleeve and the shoulder in body 123, resulting from the larger bore that receives the sleeve and the interior diminished bore in such body.

126 is a valve-stem fitted to slide in sleeve 124, and having an enlarged head, 136, at its interior extremity, and at its opposite extremity threaded in radius-block 127. Next to the head of said valve-stem is a transverse passage, 77, as shown in Figs. 17, 18, and from thence to the opposite or outer extremity is an axial passage, 76, in the stem, as shown. In said radius-block 127 is a small chamber, 128, at the end of the valve-stem, into which is delivered the water passing through such stem, and which flows upward into the curved conduit or hollow arm 129, secured in the radius-block coincident with the water-chamber therein. In the vertical part of said curved conduit or arm is an outlet, 130, to deliver water within the tumbler, and a descending axial outlet at 131, to deliver water upon the exterior of the tumbler.

132 is a set-collar, beveled at its lower and back face to conform to inner wall, 6, and rigidly secured to body 123 by set-screw 133. Formed upon or rigidly secured in this collar are pins 134, the opposite ends of which enter holes in block 127, which slides freely thereon.

135 is a spiral spring on stem 126, and exerting its force between sleeve 124 and block 127, and which, when the valve is not otherwise controlled, serves to close the same, as shown in Fig. 17, in which case head 136 of the stem is seated upon packing 125, thereby arresting the flow of water through the passage in such stem.

In the curved face of block 127 is a vertical seat or groove, 137, Fig. 17, while in the outer extremity of arm or extension 78 is pivoted a small roller, 138, the length of such arm and the position of the radius-block being such that when brought in line the consequent contact of the roller with the block will force back the block, thereby opening the valve, as shown in Fig. 18. Such seat in the block serves to hold the arm and block in contact when it is desired to hold the valve open, as the roll will only pass out of the seat by lateral force exerted upon arm 78.

The advantage of this side washer is, that when trade is dull the water may be shut entirely off from the central standard, and when it is desired to cleanse a tumbler it is placed on arms 103 of a radial holder, and when so placing it a rotary movement will be imparted thereto by the hand, and at the same instant arm 78 is so moved as to bring roller 138 into seat 137, thereby opening the slide-valve, as before described, and the water thus liberated, as it issues from arm 129, cleanses the tumbler, as before pointed out. When the tumbler is thus cleansed arm 78 is moved to disengage its roll from block 127, when by the closing of the valve water ceases to flow.

When the central and radial washers are in use the water is shut off from this side washer by the stop-cock in its supply-pipe, and the radius-block is held back out of contact with the rolls in the ends of the radial arms by a small hook, 69, Fig. 18, attached to set-screw 133, and which is then hooked to arm 129.

I claim as my invention—

1. In a tumbler-washer, the combination of the bottom 1, with an outlet, 3, the outer ornamental wall, 10, and the interior wall, 4, connected water-tight with such bottom, and arranged to inclose and confine the water from contact with such outer ornamental wall, substantially as specified.

2. In a tumbler-washer, the combination of bottom 1, with the outer ornamental wall, the base-frame 9, uniting such bottom and outer wall, and the interior water-tight wall, 4, arranged to inclose and confine the water from such base-frame and ornamental wall, substantially as specified.

3. In a tumbler-washer, the combination of bottom 1, with the outer ornamental wall, the inner ornamental wall, and the middle water-tight wall, all substantially as specified.

4. In a tumbler-washer, the combination of standard 2, having an axial passage, 54, the chambered nut 25, the coupling-nut 28, and a removable filter, combined and arranged relatively to said parts substantially as specified.

5. In a tumbler-washer, and in combination with a vertical conducting-standard, the tubular radial arms 65, having a threefold curve, forming between the central and outer curve a seat for the tumbler, and with an axial delivery-passage, 67, to act upon the exterior of the supported tumbler, and a passage, 66, at or near the apex of the central curve, to act upon the interior of such tumbler, substantially as specified.

6. In a tumbler-washer, the combination of tubular arms 65, constructed, combined, and arranged to revolve upon a common center, to receive and sustain the tumbler while so revolving, and to deliver jets of water upon both the exterior and interior thereof, with a central conduit, 64, to deliver coincident therewith a water-jet upon the center of such tumbler, substantially as specified.

7. In a tumbler-washer, the combination of standard 102, with its centrally-threaded binding-screw 104, and having a series of holes parallel with its axis, with correspondingly-radial seats cut in its upper face or peripheral rim, and with the tumbler-holding arms 103, formed at their inner ends with an angle, to be inserted in said holes in the standard around its center, and to be seated in said seats in the peripheral rim, so as to furnish a seat for the cap 105, substantially as specified.

8. The combination of sleeve 110, with its tubular arms constructed and arranged to deliver water-jets oblique to the axis of said sleeve, and the tubular arm 109, with its transverse passages coincident with the passages in said sleeve and its tubular arms, substantially as specified.

9. In combination with tubular arms 109, having transverse passages therein, the inclosing-sleeve having corresponding transverse or delivery passages of different areas, and arranged to be brought in conjunction with the passages in the arm to deliver larger or smaller jets of water, as desired, substantially as specified.

10. In a tumbler-washer, the combination of a curved arm, 106, arranged to deliver upon the tumbler jets of unvarying volume, when operative, with the horizontal arm with jets of adjustable volume, and means, substantially as described, for rendering such latter arm operative or inoperative, substantially as specified.

11. In a tumbler-washer, the combination of the upper revolving tumbler-holding arms, 103, with a stationary tubular arm, constructed and arranged below such holding-arms, to deliver a jet of water upon both the exterior and interior of the tumbler when so seated upon and being rotated by its carrying-arms, substantially as specified.

12. In a tumbler-washer, the combination of a rotary motor, 95, arranged in the conduit that supplies the jet-delivering arms, and actuated by the water passing to such arms, with the said arms constructed and arranged to receive and deliver upon both the exterior and interior of the tumbler the said water after it has so actuated the motor, substantially as specified.

13. The combination of the slide-valve, with the chambered radius-block attached to the stem of such valve, and the tubular distributing-arm 129, secured in said block, to receive in its axial passage the water entering said block, substantially as specified.

14. In a tumbler-washer, the combination of the slide-valve, with its water-jet-delivering arm 129, and the swinging arm 78, with its tumbler-holding arms 103, and arranged to be brought into contact with and to open the side valve, substantially as specified.

15. The combination of the grooved faced radius-block 127, connected with the side-valve stem, with roller 138, arranged in arm 78 of the minor washer, substantially as specified.

16. In a tumbler-washer having a common center and minor washers arranged about the same, a stop-cock combined with each such minor washers, whereby any desired number of such minor washers may be rendered operative or inoperative at will, substantially as specified.

17. In a tumbler-washer, the combination of a rotary center having radial arms bearing washers thereon, with rotary motors thereto attached, with a central motor secured to and arranged to actuate such center, whereby, when operative, each of such minor or radial washers will, by its separate motor, be rotated upon its own axis, while all will be carried through an orbit by such central motor, substantially as specified.

WILLIAM P. CLARK.

Witnesses:
EUGENE HUMPHREY,
T. W. PORTER.